United States Patent
O'Hara et al.

(10) Patent No.: US 11,616,807 B2
(45) Date of Patent: Mar. 28, 2023

(54) CLUSTERING NETWORK SERVERS FOR DENIAL OF SERVICE ATTACKS

(71) Applicant: Arbor Networks, Inc., Westford, MA (US)

(72) Inventors: Sean O'Hara, Ypsilanti, MI (US); Alan Saqui, Ann Arbor, MI (US)

(73) Assignee: Arbor Networks, Inc., Westford, MA (US)

( * ) Notice: Subject to any disclaimer, the term of this patent is extended or adjusted under 35 U.S.C. 154(b) by 379 days.

(21) Appl. No.: 16/733,687

(22) Filed: Jan. 3, 2020

(65) Prior Publication Data
US 2021/0211457 A1 Jul. 8, 2021

(51) Int. Cl.
*H04L 9/40* (2022.01)
*H04L 41/0893* (2022.01)
*H04L 41/16* (2022.01)

(52) U.S. Cl.
CPC ...... *H04L 63/1458* (2013.01); *H04L 41/0893* (2013.01); *H04L 41/16* (2013.01); *H04L 63/1416* (2013.01); *H04L 63/1425* (2013.01)

(58) Field of Classification Search
CPC . H04L 41/0893; H04L 43/04; H04L 63/0227; H04L 63/1408; H04L 63/1416; H04L 63/1425; H04L 63/1458; H04L 63/20; H04L 2463/142
See application file for complete search history.

(56) References Cited

U.S. PATENT DOCUMENTS

| 10,177,998 B2 * | 1/2019 | Parandehgheibi .. H04L 43/0882 |
| 2019/0123983 A1 * | 4/2019 | Rao ...................... H04L 41/0896 |

FOREIGN PATENT DOCUMENTS

| EP | 3477906 A1 * | 5/2019 | ............. H04L 29/06 |

* cited by examiner

*Primary Examiner* — Kevin Bechtel
(74) *Attorney, Agent, or Firm* — Locke Lord LLP; Scott D. Wofsy; Christopher J. Capelli

(57) ABSTRACT

A computer method and system to determine one or more sub-groups of protected network servers for receiving common network filter settings for mitigating Denial of Services (Dos) attacks. Network traffic associated with the plurality of network servers is captured and collated for each of the plurality of network servers. The collated network traffic is then analyzed to determine a profile of one or more network services provided by each of the plurality of network servers. Each of the plurality of network servers is then tagged with one or more network services determined provided by each network server based upon analysis of the collated network traffic. Metadata is then determined from the collated network traffic that is associated with each of the plurality of network servers. A determination of sub-group clustering is made of one or more of the plurality of network servers contingent upon the one or more determined network service tags and the determined meta data associated with each of the plurality of network servers. Common DoS mitigation actions may then be prescribed for each of the determined sub-group clusters of network servers.

19 Claims, 4 Drawing Sheets

CLUSTERING NETWORK SERVERS FOR DENIAL OF SERVICE ATTACKS

FIELD OF THE INVENTION

The disclosed embodiments generally relate to clustering network servers, and more particularly, to classifying network servers using network traffic analysis and metadata associated with server network traffic.

BACKGROUND OF THE INVENTION

The Internet is a global public network of interconnected computer networks that utilize a standard set of communication and configuration protocols. It consists of many private, public, business, school, and government networks. Within each of the different networks are numerous host devices such as workstations, servers, cellular phones, portable computer devices, to name a few examples. These host devices are able to connect to devices within their own network or to other devices within different networks through communication devices such as hubs, switches, routers, and firewalls, to list a few examples.

The growing problems associated with security exploits within the architecture of the Internet are of significant concern to network providers. Networks and network devices are increasingly affected by the damages caused by Denial of Service ("DoS") attacks. A DoS attack is defined as an action taken upon on a computer network or system by an offensive external device that prevents any part of the network from functioning in accordance with its intended purpose. This attack may cause a loss of service to the users of the network and its network devices. For example, the loss of network services may be achieved by flooding the system to prevent the normal servicing for performing legitimate requests. The flooding may consume all of the available bandwidth of the targeted network or it may exhaust the computational resources of the targeted system.

It is to be appreciated that the process of setting up DoS protection for servers currently requires a comprehensive understanding of each service that each server provides. Information such as the ports the services run on, the protocols used by each service, and the expected traffic behavior are necessary to determine the proper configuration of the DoS countermeasures. Due to current technical limitations in the number of countermeasure configurations that can be concurrently performed, it is desirable to create customized DoS countermeasure configurations to be applied to a group of servers having similar DoS countermeasure requirements (i.e., protection groups). However, users of network servers often do not have a complete understanding of what is on their network, and as such are unable to group their servers to receive optimal DoS countermeasure customized for such a grouping. Additionally, networks can evolve and change over time as new services are added and servers are repurposed. Thus, this process of grouping servers together may need to be performed on an ongoing basis.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with the illustrated embodiments, the methods and systems disclosed herein protect servers from Distributed Denial of Service (DDoS) and DoS attacks which often is significantly contingent upon on the type of service (or services) that is provided by a network server. By classifying servers into distinct categories, the methods and computer systems of the illustrated embodiments more efficiently protect network servers by applying DDos/DoS countermeasures relevant to their network services.

To achieve these and other advantages and in accordance with the purpose of the illustrated embodiments, in one aspect a computer method and system to determine one or more sub-groups of protected network servers for receiving common network filter settings for mitigating Denial of Services (Dos) attacks is disclosed in which network traffic associated with the plurality of network servers is captured and collated for each of the plurality of network servers. The collated network traffic is then analyzed to determine a profile of one or more network services provided by each of the plurality of network servers. Each of the plurality of network servers is then tagged with one or more network services determined provided by each network server based upon analysis of the collated network traffic. Metadata is then determined from the collated network traffic that is associated with each of the plurality of network servers. A determination of sub-group clustering is made of one or more of the plurality of network servers contingent upon the one or more determined network service tags and the determined meta data associated with each of the plurality of network servers. Common DoS mitigation actions may then be prescribed for each of the determined sub-group clusters of network servers.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
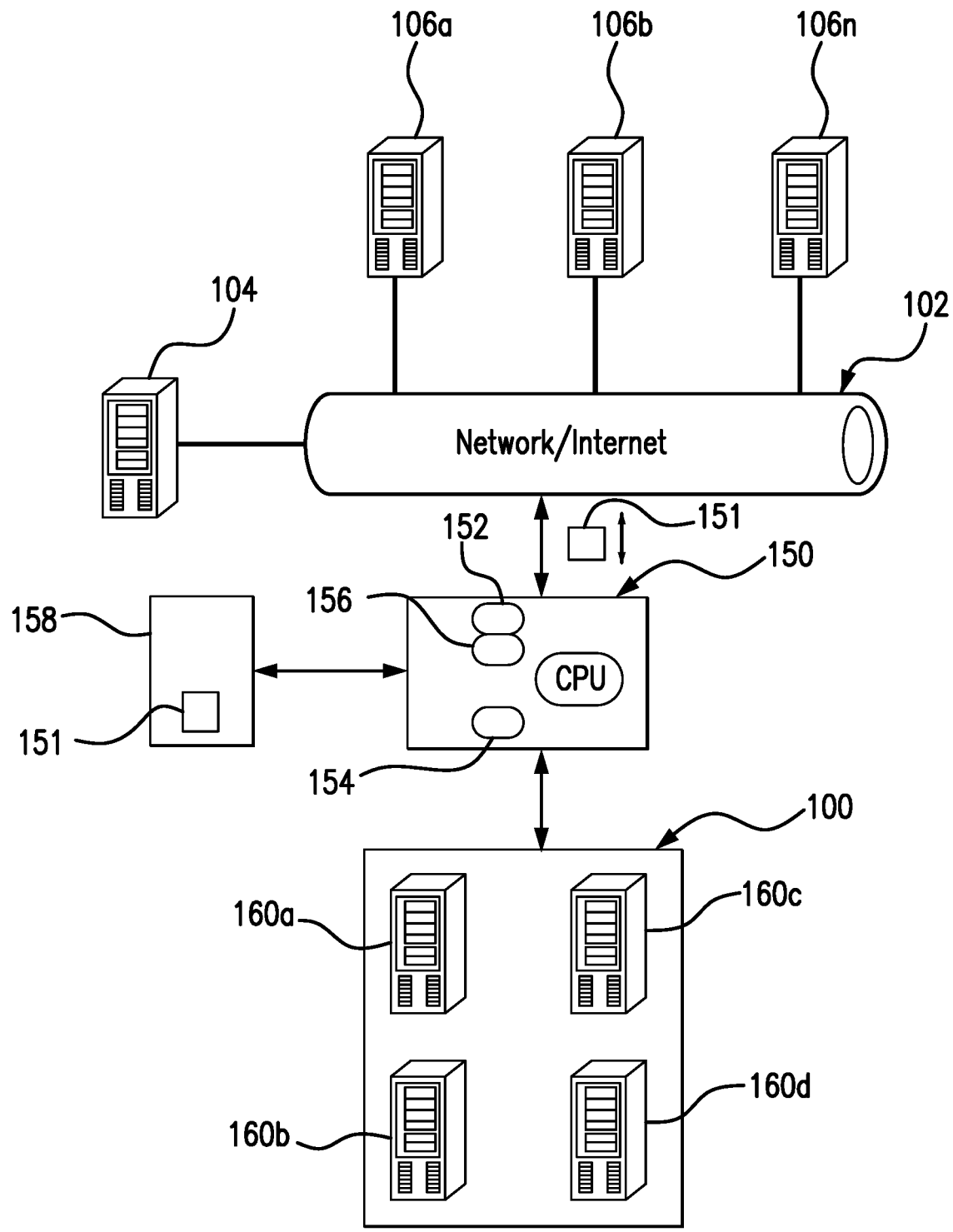
FIG. 1 illustrates an exemplary network communications system, in which an embodiment of the present invention may be implemented.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

The present illustrated embodiments relate to determining a comprehensive understanding of the services that each network server performs for configuring DDoS protection for servers desired to have DDoS countermeasure protection. Acquiring information such as the ports the services run on, the protocols used by each service, and the expected traffic behavior are desirable to determine the proper configuration of the DDoS countermeasures for network servers. As mentioned above, due to current technical limitations in the number of countermeasure configurations that can be concurrently performed, it is desirable to create customized DoS countermeasure configurations to be applied to a group of servers having similar DoS countermeasure requirements (i.e., protection groups), which is accomplished below in accordance the illustrated embodiments.

Turning now descriptively to the drawings, in which similar reference characters denote similar elements throughout the several views, FIG. 1 illustrates a generalized monitoring/countermeasure system for applying customized DoS countermeasure configurations to a group of servers determined to have similar DoS countermeasure requirements (i.e., protection groups). The exemplary embodiment of FIG. 1 depicts the relationship between a protected network 100, protection system 150, Network/Internet 102, and external host devices 106a-106n. It is to be appreciated that protected network 100 preferably includes a plurality of servers 160a-160n preferably consisting of a plurality of server types, including, but not limited to: Generic; Web; DNS; Mail; VoIP; VPN; RLogin; and File Servers. It is to be appreciated that in accordance with an illustrated embodiment, the protection system 150 is configured and operable to determine one or more clusters of network servers from the protected network 100 to receive common DDoS countermeasures to be applied to a group of servers having similar DDoS countermeasure requirements (i.e., protection groups).

It is to be appreciated that the illustrated embodiment of FIG. 1 is provided for ease of discussions purposes only for depicting a generalized exemplary environment of use for a denial of service protection system using IP location services. As such, it is to be understood the illustrated embodiment of FIG. 1 is not to be understood to be limiting, as other systems capable of carrying out the process for determining one or more clusters of network servers from the protected network 100 to receive common DDoS countermeasures to be applied to a group of servers having similar DDoS countermeasure requirements. In a typical implementation, the external host devices 106a-106n (also referred to as external devices or host devices) attempt to connect to protected network server devices 160a-160n within a protected network 100 typically via a private network or a public computer network such as the Internet 102. Examples of external host devices include servers, laptops, desktop computers, tablet devices, mobile phones, mobile computing devices, video games systems, televisions and other similar devices and systems having Internet connectivity.

In a preferred embodiment, the protected network 100 is protected by a protection system 150 preferably located between the Internet 102 and the protected network 100. Usually, the protected network 100 is an enterprise network, such as a school network, business network, and government network, to list a few examples.

In other embodiments, the protection system 150 is located within the Internet, service provider network or enterprise network rather than as a network edge as illustrated. It is to be appreciated that when deployed within the protected network 100, traffic is diverted to the protection system 150.

The protection system 150 preferably includes a packet processing system preferably having an external high speed network interface 152 and a protected high-speed network interface 154. Typically, these interfaces are capable of handling 1-100 Gbps, for example. System 150 may further include processing modules, such as traffic analyzer 156 that preferably process the packets received at interfaces 152 and 154. Additionally, a central processing unit (CPU), random access memory (RAM), and one or more storage mediums/databases 158 are preferably connected through buses and are used to further support the threat detection processing of the received packets in accordance with the illustrated embodiments. Computer code is preferably stored in storage medium 158 and executed by the CPU of protection system 150. In one illustrated embodiment, the storage medium 158 may preferably include content-addressable memory (CAM), which is memory designed for use in very high speed searching applications. It is noted CAM memory operates different from the more commonly used random access memory (RAM). With RAM memory a memory address is specified and the data stored at that address is returned. With CAM memory, the entire memory is searched to see if specified data are stored anywhere in the memory. The storage medium 158 may preferably store capture, and collated, sample network traffic data packets, as discussed further below.

In a typical implementation, the protection system 150 is configured and operable to classify and cluster network servers 160a-160d within the protected network 100 to efficiently protect the determined cluster servers by applying common DDos/DoS countermeasures relevant to network services provided by the determined clustered network servers.

Figure 2:
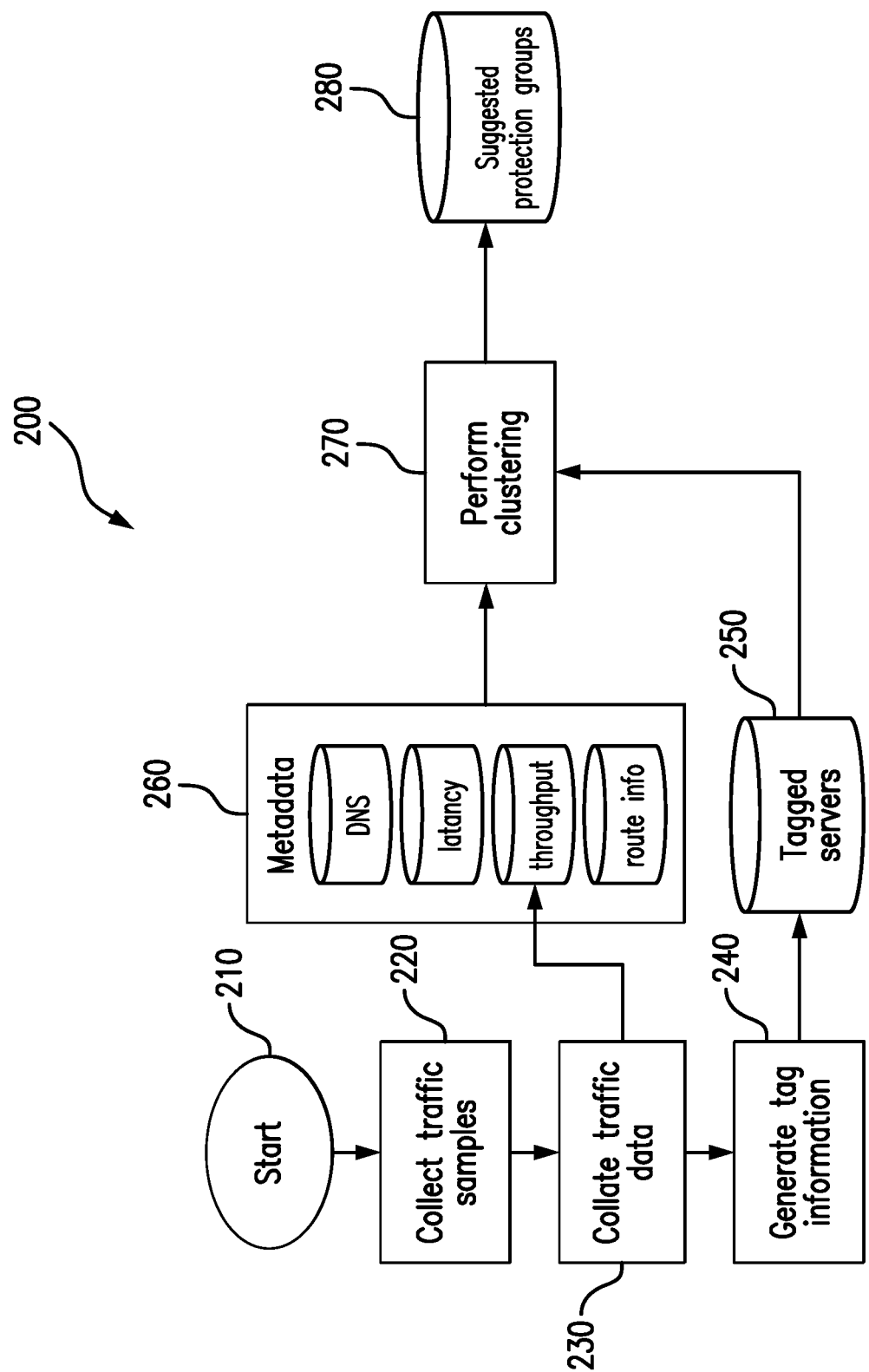
FIG. 2 is a flowchart of operational steps performed in accordance with an illustrative embodiment of the present invention.

With reference now to FIG. 2 (and with continuing reference to FIG. 1) shown is flowchart depicting certain operational steps (process 200) performed by the protection device 150 in accordance with illustrative embodiments. Before turning to the descriptions of FIG. 2, it is noted that the flow diagram shown therein is described, by way of example, with reference to components shown in FIG. 1, although these operational steps may be carried out in any system and are not limited to the scenario shown in the aforementioned figures. Additionally, the flow diagram in FIG. 2 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

Figure 3A:
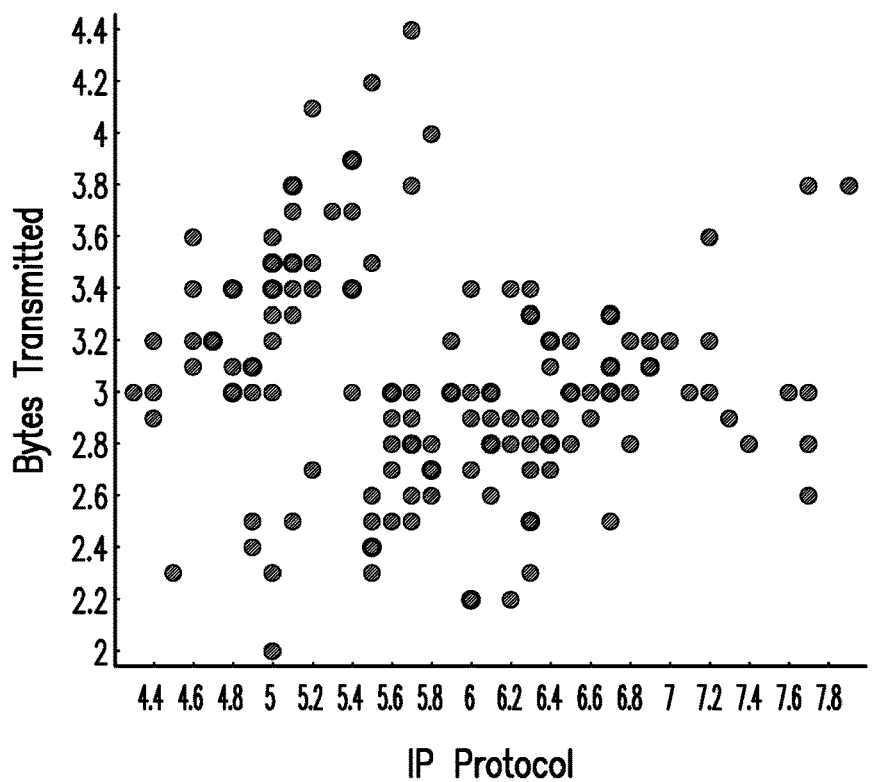
FIG. 3A-D illustrates screen shots generated by the protection device of FIG. 1 depicting determinations and categorizations utilizing collected network traffic associated with protected servers.
Figure 3B:
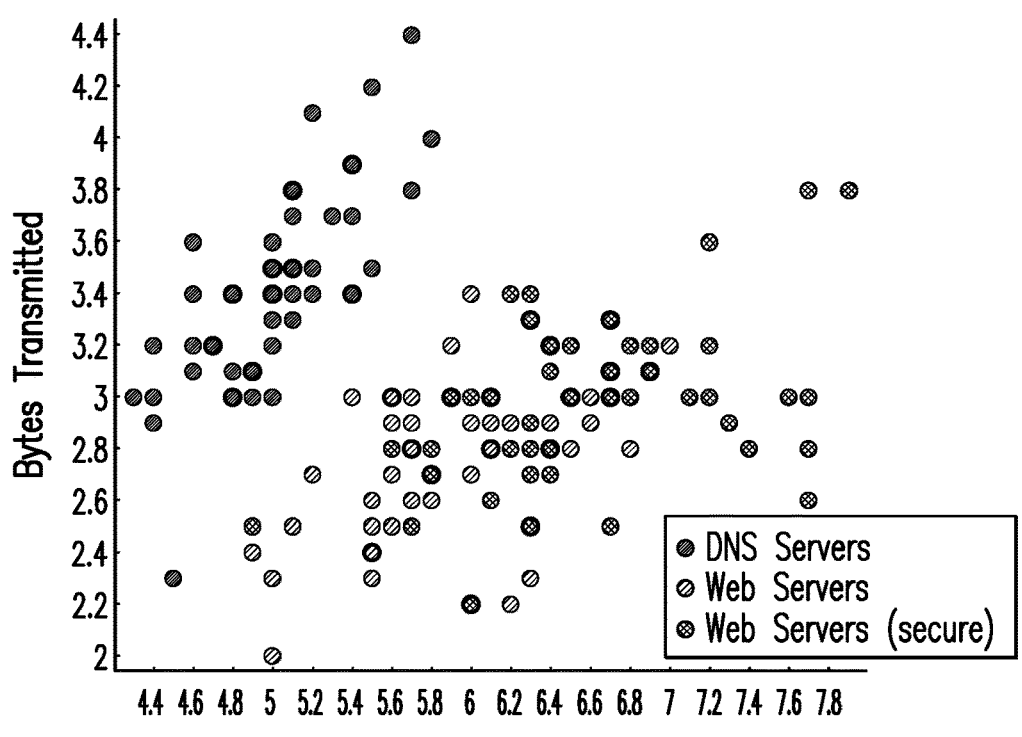

Starting at step 210, in a traffic flow 151 received by the protection device 150, included in the traffic flow is data packets transmitting to and from external devices 104, 106a-106n with one or more protected devices 160a-160n. It is to be appreciated the traffic flow may be data packets transmitted from the protected devices 160a-160d, data packets transmitted from the external devices 104, 106a-106d, and data packets flowing both to and from the external devices 104, 106a-106d and the protected devices 160a-160d. Preferably a sample of data packets associated with the network servers 160a-160d are captured from the data packet traffic flow 151 (step 220). FIG. 3A indicates a screen shot, preferably generated by protection device 150, indicating the collected data packet samples. These captured data packets are then collated and grouped according to the protected network server 160a-160d that is associated with the captured packets (step 220), and are preferably stored in one or more databases associated with storage device 158. The collated captured data packets are then preferably analyzed to determine a profile of one or more network services provided by each of the protected network servers 160a-160d associated with the stored collated data packets, preferably chosen from a predefined listing of network services. For instance, examples of such network services may include (but are not to be limited to): HyperText Transfer Protocol (HTTP); Hypertext Transfer Protocol Secure (HTTPS); Simple Mail Transfer Protocol (SMTP); and Voice over Internet Protocol (VoIP)). These network services determinations may be made from analysis of the samples of traffic data collected such as determining the utilized server ports of the network servers 160a-160d associated with the sample data traffic samples collected. For example, if the collected data samples indicate a server 160a utilized ports 80 and 25, then this would indicate that server 160a is performing HTTP (port 80) and SMTP (port 25) network services functionality. Next, each of the protected network servers 160a-160d associated with the stored collated data packets are tagged (step 250) with one or more network services determined provided by each network server 160a-160d based upon analysis of the collated network traffic by the protection device 150 (step 240). FIG. 3B indicates a screen shot, preferably generated by protection device 150, indicating protected servers 160a-160d having same tags (e.g., DNS Servers, Web Servers and Web Servers).

An example of such an analysis of the captured collated data packets may include for instance, determining an identity of a utilized port of a network server 160a-160d associated with the collated network traffic for each of the plurality of network servers 160a-160d. Thus, it is to be understood the protection device 150 is operable, based upon the collected metadata (step 260), to broadly categorize the network services (e.g., mail servers, web servers, DNS servers, etc.) provided by the protected network servers 160a-160d.

Figure 3C:
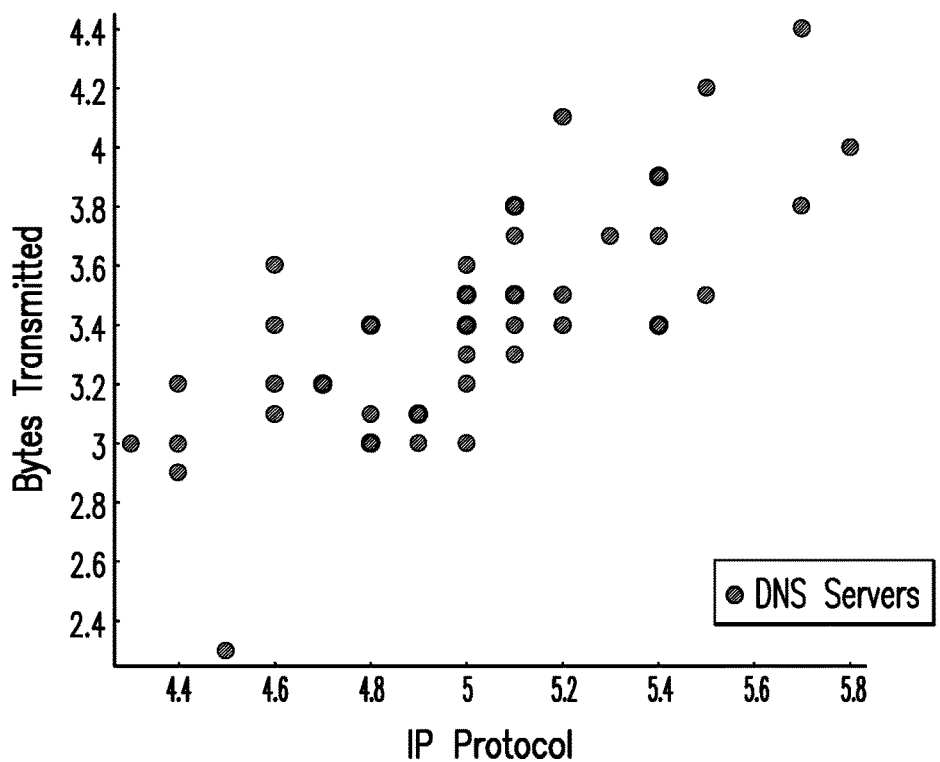

With regards to the stored collated network traffic (step 230), the protection device 150 is further configured and operable to determine additional metadata that was not present in the captured network traffic sample (step 260). For instance, the determined metadata associated with each of the plurality of network servers 160a-160d associated with the collated network traffic may include one or more of determining (but it not to be understood to be limited to): a domain name; network traffic speed; network packet route information; and network packet latency associated with each of the plurality of network servers 160a-160d. FIG. 3C indicates a screen shot, preferably generated by protection device 150, indicating protected network servers 160a-160d determined to be tagged with the tag "DNS".

It is to be appreciated that additional information regarding the protected network servers 160a-160d may be determined from analysis of the collected metadata. For instance, if the metadata includes DNS information indicating a server 160a has a domain name including "mail.server", then this would indicate that the server 160a is performing mail services, such as SMTP. As an another example, if the metadata indicates a server 160b has a relatively high latency, then analysis by protection device 150 would indicate this server 160b is located in a location remote from other network servers having a substantially lower latency.

Figure 3D:
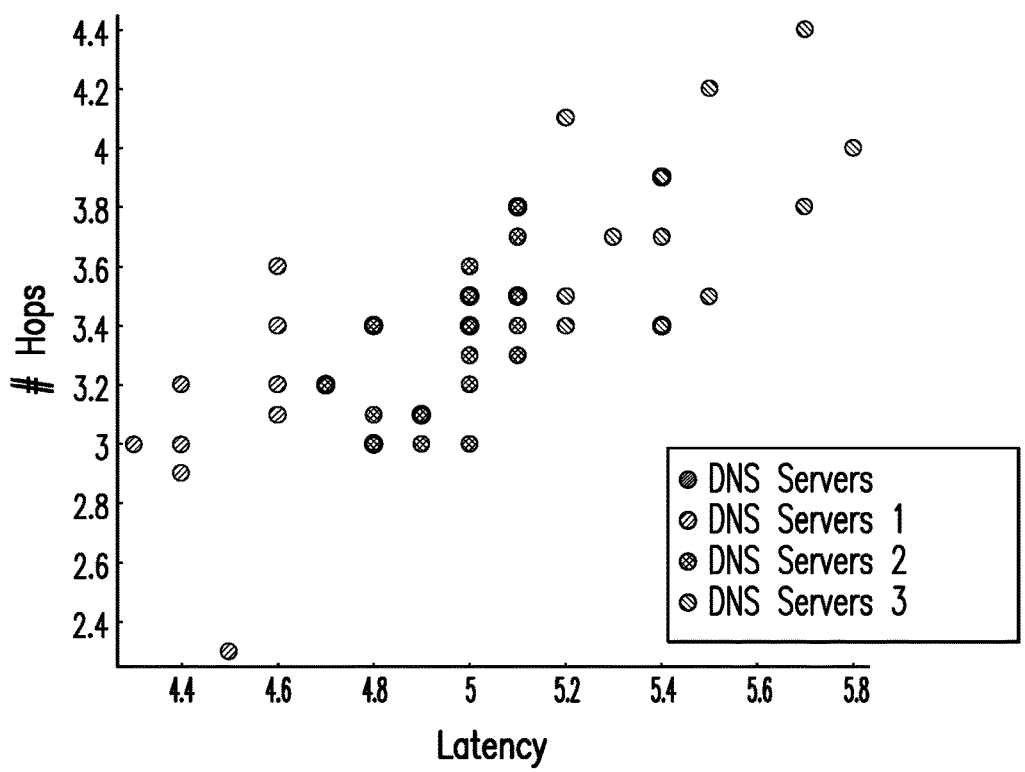

Next (at step 270), sub-group clustering of one or more of the plurality of network servers 160a-160d is determined by the protection device 150 utilizing the one or more determined network service tags (step 240) and the determined meta data (step 260) associated with each of the plurality of network servers 160a-160d. In making these sub-group clustering determinations, the protection device 150 preferably utilizes machine learning techniques to normalize the determined tag information (step 240) and metadata (step 260) associated with each of the plurality of network server's 160a-160d. For instance, sub-group clustering can include creating a sub-group of network servers determined to have DNS server functionality associated with high traffic throughput, and another sub-group of network servers determined to have DNS server functionality associated with low traffic throughput. For example, FIG. 3D indicates a screen shot, preferably generated by protection device 150, indicating sub-group clustering of network servers 160a-160d tagged with a "DNS" tag, clustered in accordance with its associated determined latency. Preferably unsupervised machine learning techniques (e.g., k-means algorithm) are applied by the protection device 150 utilizing the metadata (step 260) collected for each unique grouping of servers based on their tags (step 240).

Based on the results of the aforesaid clustering analysis (step 270), a set of suggested protection groups is determined, preferably prescribing common DoS mitigation actions, for each of the determined sub-group cluster of network servers 160a-160d (step 280). Examples of such DoS mitigation actions include (but are not to be understood to be limited to): limiting bandwidth associated with suspected attack traffic; altering traffic routes for suspected attack traffic; and filtering out suspected attack traffic destined for the determined sub-group cluster of network servers.

It is to be appreciated that the above described process 200 of FIG. 2 is preferably performed automatically by the protection device 150, which can be conducted at regular intervals to either verify that the current set of protection groups is sufficient, and/or to update a set of protection groups (step 280) to address changes made to the protected network 100 subsequent to performance of the above process 200.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A method performed by a computer system having one or more processors and memory storing one or more programs for execution by the one or more processors for monitoring network traffic associated with a plurality of protected network servers to determine one or more sub-groups of protected network servers for receiving common network filter settings for mitigating Denial of Services (DoS) attacks, comprising the steps:
capturing network traffic associated with the plurality of network servers;
collating the captured network traffic for each of the plurality of network servers;
analyzing the collated network traffic to determine a profile of one or more network services provided by each of the plurality of network servers;
tagging each of the plurality of network servers with one or more network services determined provided by each network server based upon the analyzing of the collated network traffic;
determining metadata, that was not present in the captured network traffic, that is associated with each of the plurality of network servers; and
determining sub-group clustering of one or more of the plurality of network servers contingent upon the one or more determined network service tags and the determined metadata associated with each of the plurality of network servers;
determining DoS mitigation actions for each of the determined sub-group clustering of network servers; and
applying determined DoS mitigation actions to each of the determined sub-group clustering of network servers the determined DoS mitigation actions are common to.

2. The method as recited in claim 1, wherein capturing network traffic includes capturing network traffic flowing to and from the plurality of network servers.

3. The method as recited in claim 1, wherein capturing network traffic includes capturing a sample of network traffic associated with each of the plurality of network servers.

4. The method as recited in claim 1, wherein determining a profile of one or more network services includes selecting from a predefined list of one or more network services.

5. The method as recited in claim 4, wherein the predefined list of one or more network services consists of: HyperText Transfer Protocol (HTTP); Hypertext Transfer Protocol Secure (HTTPS); Simple Mail Transfer Protocol (SMTP); and Voice over Internet Protocol (VoIP).

6. The method as recited in claim 1, wherein analyzing the collated network traffic includes determining an identity of a port of a network server associated with the collated network traffic for each of the plurality of network servers.

7. The method as recited in claim 1, wherein determining the metadata associated with each of the plurality of network servers includes one or more of determining: a domain name; network traffic speed; network packet route information; and network packet latency associated with each of the plurality of network servers.

8. The method as recited in claim 1, wherein determining sub-group clustering of one or more of the plurality of network servers includes normalizing the tag information and metadata associated with each of the plurality of network servers.

9. The method as recited in claim 8, further including using one or more machine learning techniques on the normalized tag information and metadata associated with each of the plurality of network servers.

10. The method as recited in claim 9, wherein the one or machine learning techniques includes a k-means algorithm.

11. The method as recited in claim 1, wherein prescribing common DoS mitigation actions includes one or more of: limiting bandwidth associated with suspected attack traffic; altering traffic routes for suspected attack traffic; and filtering out suspected attack traffic destined for the determined sub-group cluster of network servers.

12. A computer system for monitoring network traffic associated with a plurality of protected network servers to determine one or more sub-groups of protected network servers for receiving common network filter settings for mitigating Denial of Services (DoS) attacks, comprising:
one or more databases;
memory configured to store instructions;
a processor disposed in communication with said memory, wherein said processor upon execution of the instructions is configured to:
intercept data communications in a computer network to capture at least a sample of network traffic transmitting between one or more external hosts with the plurality of protected network servers;
collate the captured network traffic for each of the plurality of network servers;
store the collated captured network traffic in the one or more data bases;
analyze the stored collated network traffic to determine a profile of one or more network services provided by each of the plurality of network servers;
tag each of the plurality of network servers with one or more network services determined provided by each network server based upon the analyzing of the stored collated network traffic;
determine, that was not present in the captured network traffic, that is associated with each of the plurality of network servers;
determine sub-group clustering of one or more of the plurality of network servers contingent upon the one or more determined network service tags and the determined metadata associated with each of the plurality of network servers;

determine DoS mitigation actions for each of the determined sub-group clustering of network servers;

apply determined DoS mitigation actions to each of the determined sub-group clustering of network servers the determined DoS mitigation actions are common to; and display, on the user display associated with the computer system, a graph representative of the one or more sub-group clusters of network servers.

13. The computer system as recited in claim 12, wherein determining a profile of one or more network services includes selecting from a predefined list of one or more network services and wherein the predefined list of one or more network services consists of: HyperText Transfer Protocol (HTTP); Hypertext Transfer Protocol Secure (HTTPS); Simple Mail Transfer Protocol (SMTP); and Voice over Internet Protocol (VoIP).

14. The computer system as recited in claim 12, wherein analyzing the collated network traffic includes determining an identity of a port of a network server associated with the collated network traffic for each of the plurality of network servers and wherein determining the metadata associated with each of the plurality of network servers includes one or more of determining: a domain name; network traffic speed; network packet route information; and network packet latency associated with each of the plurality of network servers.

15. The computer system as recited in claim 12, wherein determining sub-group clustering of one or more of the plurality of network servers includes normalizing the tag information and metadata associated with each of the plurality of network servers and further including using one or more machine learning techniques on the normalized tag information and metadata associated with each of the plurality of network servers.

16. A non-transitory computer readable storage medium and one or more computer programs embedded therein, the computer programs comprising instructions, which when executed by a computer system, cause the computer system to determine one or more sub-groups of protected network servers for receiving common network filter settings for mitigating Denial of Services (DoS) attacks in a computer network, comprising:

intercepting data communications in the computer network to capture at least a sample of network traffic transmitting between the one or more external hosts with the plurality of protected network servers;

collating the captured network traffic for each of the plurality of network servers;

storing the collated captured network traffic in one or more databases;

analyzing the stored collated network traffic to determine a profile of one or more network services provided by each of the plurality of network servers;

tagging each of the plurality of network servers with one or more network services determined provided by each network server based upon the analyzing of the stored collated network traffic;

determining metadata, that was not present in the captured network traffic, that is associated with each of the plurality of network servers;

determining sub-group clustering of one or more of the plurality of network servers contingent upon the one or more determined network service tags and the determined metadata associated with each of the plurality of network servers; determining DoS mitigation actions for each of the determined sub-group clustering of network servers;

applying determined DoS mitigation actions to each of the determined sub-group clustering of network servers the determined DoS mitigation actions are common to; and displaying, on a user display associated with the computer system, a graph representative of the one or more sub-group clusters of network servers.

17. The non-transitory computer readable storage medium as recited in claim 16, wherein determining a profile of one or more network services includes selecting from a predefined list of one or more network services and wherein the predefined list of one or more network services consists of: HyperText Transfer Protocol (HTTP); Hypertext Transfer Protocol Secure (HTTPS); Simple Mail Transfer Protocol (SMTP); and Voice over Internet Protocol (VoIP).

18. The non-transitory computer readable storage medium as recited in claim 17, wherein analyzing the collated network traffic includes determining an identity of a port of a network server associated with the collated network traffic for each of the plurality of network servers and wherein determining the metadata associated with each of the plurality of network servers includes one or more of determining: a domain name; network traffic speed; network packet route information; and network packet latency associated with each of the plurality of network servers.

19. The non-transitory computer readable storage medium as recited in claim 16, wherein determining sub-group clustering of one or more of the plurality of network servers includes normalizing the tag information and metadata associated with each of the plurality of network servers and further including using one or more machine learning techniques on the normalized tag information and metadata associated with each of the plurality of network servers.

* * * * *